(12) United States Patent
Roos

(10) Patent No.: US 7,235,894 B2
(45) Date of Patent: Jun. 26, 2007

(54) INTEGRATED FLUID POWER CONVERSION SYSTEM

(76) Inventor: Paul W. Roos, 711 NW. 4th Ave., Delray Beach, FL (US) 33444

( * ) Notice: Subject to any disclaimer, the term of this patent is extended or adjusted under 35 U.S.C. 154(b) by 0 days.

(21) Appl. No.: 11/217,808

(22) Filed: Sep. 1, 2005

(65) Prior Publication Data

US 2006/0043738 A1 Mar. 2, 2006

Related U.S. Application Data

(60) Provisional application No. 60/606,447, filed on Sep. 1, 2004, provisional application No. 60/619,646, filed on Oct. 18, 2004.

(51) Int. Cl.
*F03B 13/00* (2006.01)
(52) U.S. Cl. ...................................... 290/54
(58) Field of Classification Search ............. 417/423.1
See application file for complete search history.

(56) References Cited

U.S. PATENT DOCUMENTS

| | | | | |
|---|---|---|---|---|
| 2,949,540 | A * | 8/1960 | Clayton | 290/40 R |
| 3,143,972 | A * | 8/1964 | Smith et al. | 417/356 |
| 5,490,768 | A * | 2/1996 | Veronesi et al. | 417/356 |
| 5,494,413 | A * | 2/1996 | Campen et al. | 417/356 |
| 5,951,262 | A * | 9/1999 | Hartman | 417/356 |
| 6,015,272 | A * | 1/2000 | Antaki et al. | 417/356 |
| 6,045,418 | A | 4/2000 | Roos | |
| 6,056,518 | A * | 5/2000 | Allen et al. | 417/355 |
| 6,358,107 | B1 | 3/2002 | Roos | |
| 6,364,725 | B1 | 4/2002 | Roos | |
| 6,692,318 | B2 | 2/2004 | McBride | |
| 6,702,555 | B2 * | 3/2004 | Allen et al. | 417/423.1 |
| 7,021,905 | B2 * | 4/2006 | Torrey et al. | 417/356 |

FOREIGN PATENT DOCUMENTS

| | | | | |
|---|---|---|---|---|
| GB | | 2050525 A | * | 1/1981 |
| JP | | 2003193952 A | * | 7/2003 |
| WO | WO | 3025385 A2 | * | 3/2003 |
| WO | WO | 2005080790 A1 | * | 9/2005 |

* cited by examiner

*Primary Examiner*—Joseph Waks
(74) *Attorney, Agent, or Firm*—Jansson Shupe & Munger Ltd.

(57) ABSTRACT

A fluid power conversion apparatus serving fluid pumping and/or power-generation functions, comprising: an impeller having an impeller hub and a periphery; a housing around the impeller; a diffusor having (a) an outer wall attached to the housing, (b) a diffusor hub rotatably supporting the impeller, and (c) at least one stator vane securing the diffusor hub to the outer wall; and a rotating electrical machine having (a) an armature attached to the housing and (b) a rotor attached to the impeller periphery and positioned to form a rotor-armature gap, whereby the impeller and the rotor form an integrated unit with fluid flow through the rotor.

12 Claims, 6 Drawing Sheets

INTEGRATED FLUID POWER CONVERSION APPARATUS

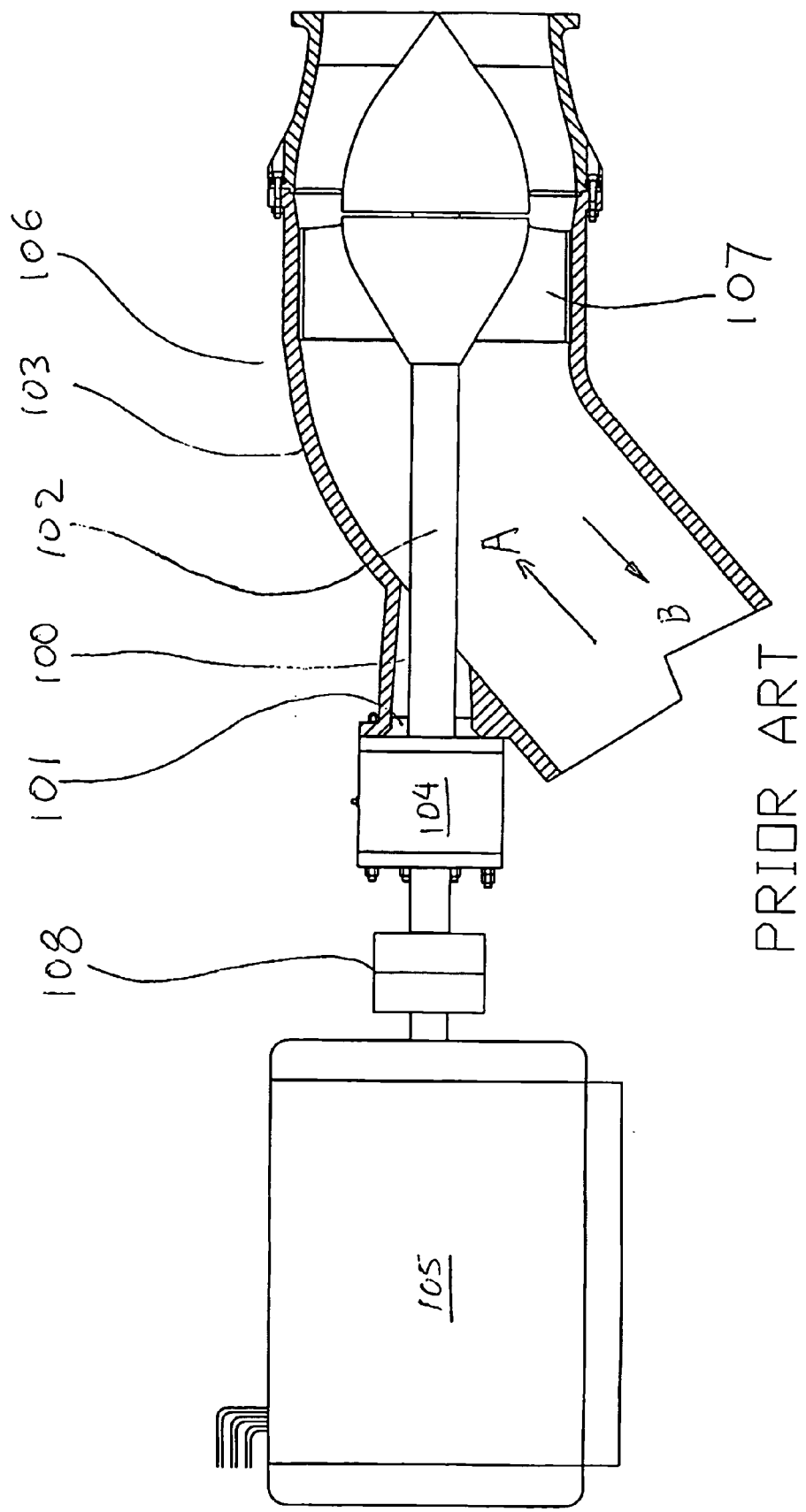
FIG. 1 CONVENTIONAL FLUID POWER CONVERSION SYSTEM

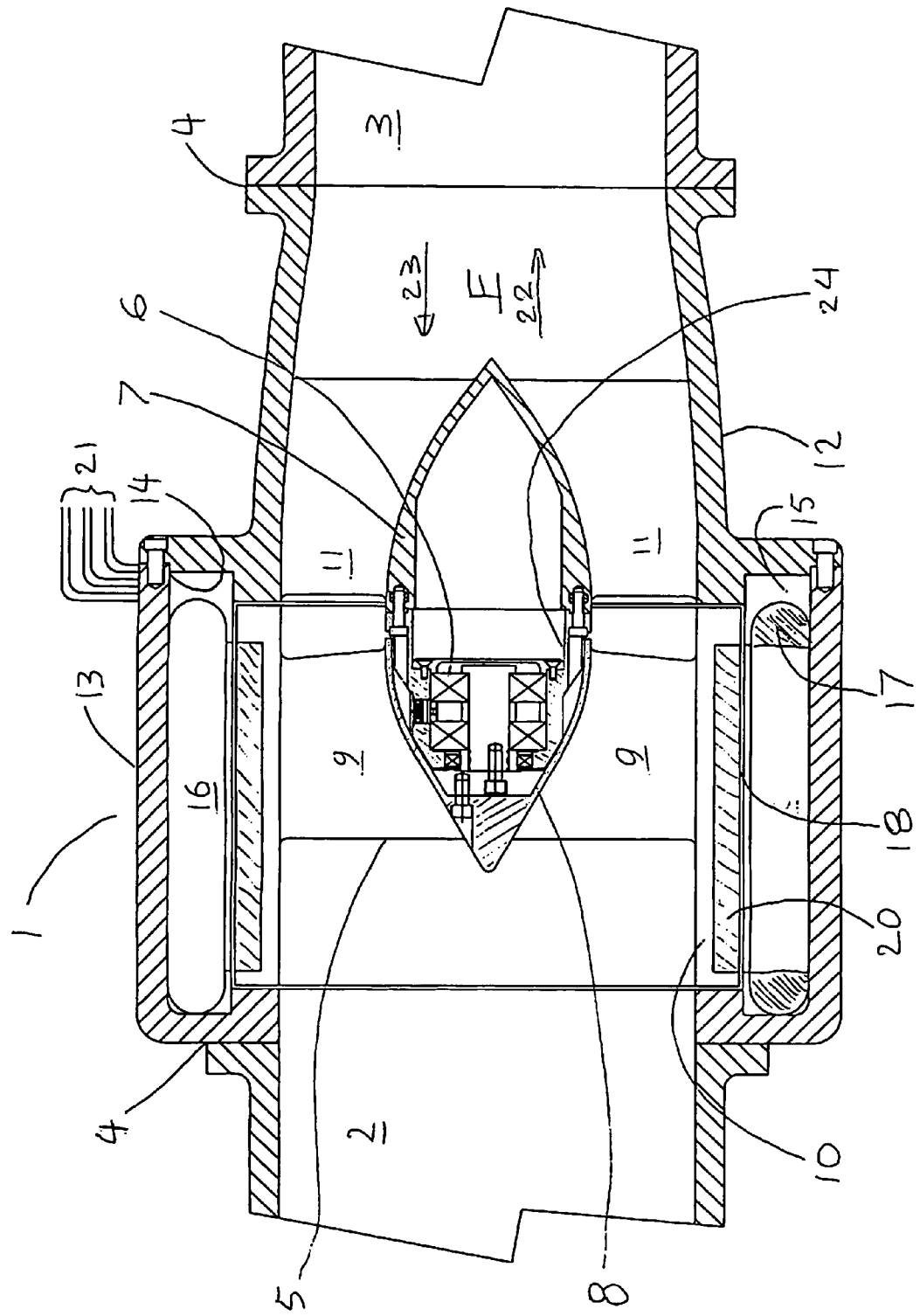
FIG. 2 INTEGRATED FLUID POWER CONVERSION APPARATUS

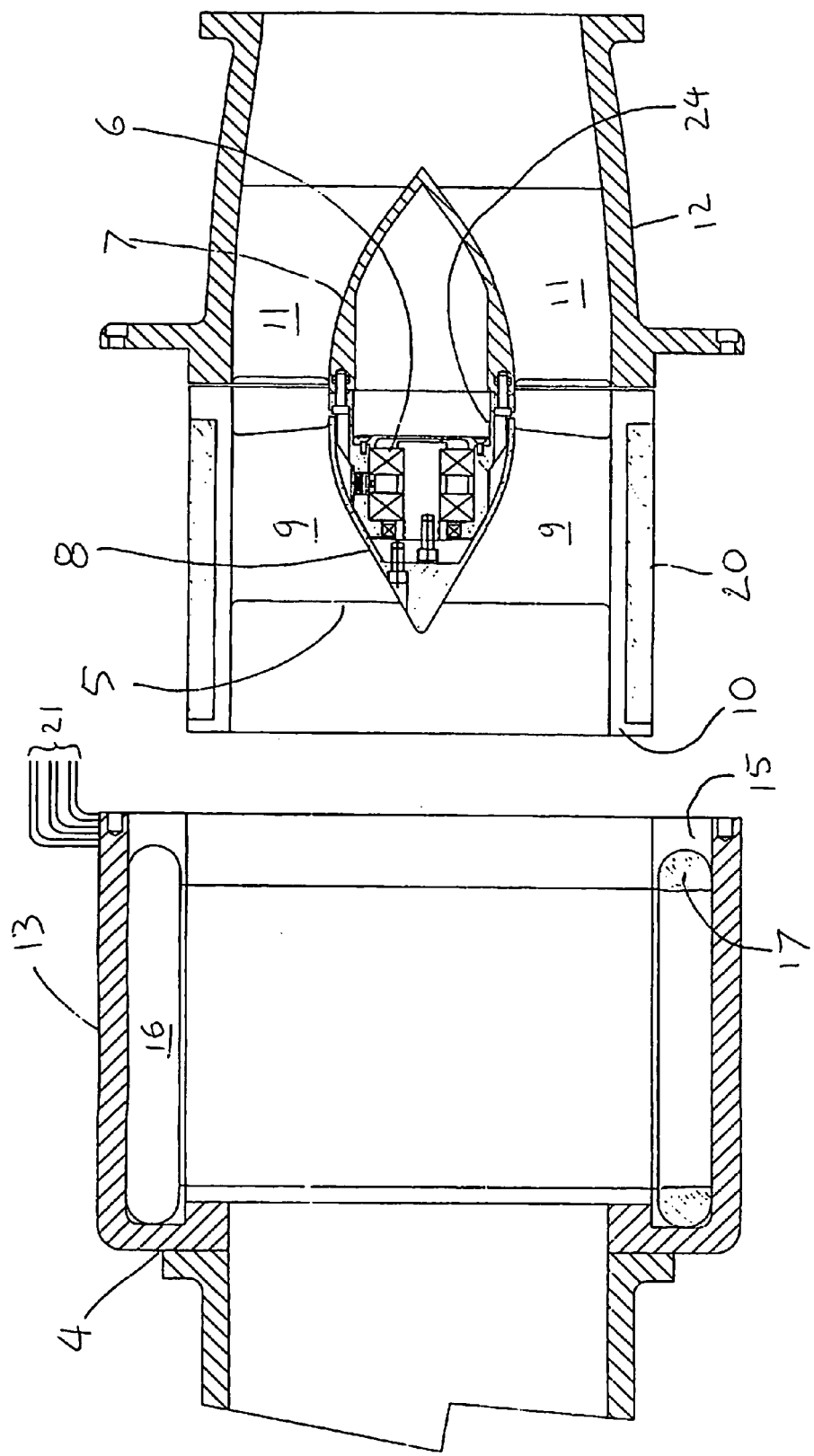
FIG. 3   ARMATURE AND ROTOR SEPARATED SHOWING ROTOR BEARING IS SUPPORTED BY DIFFUSOR

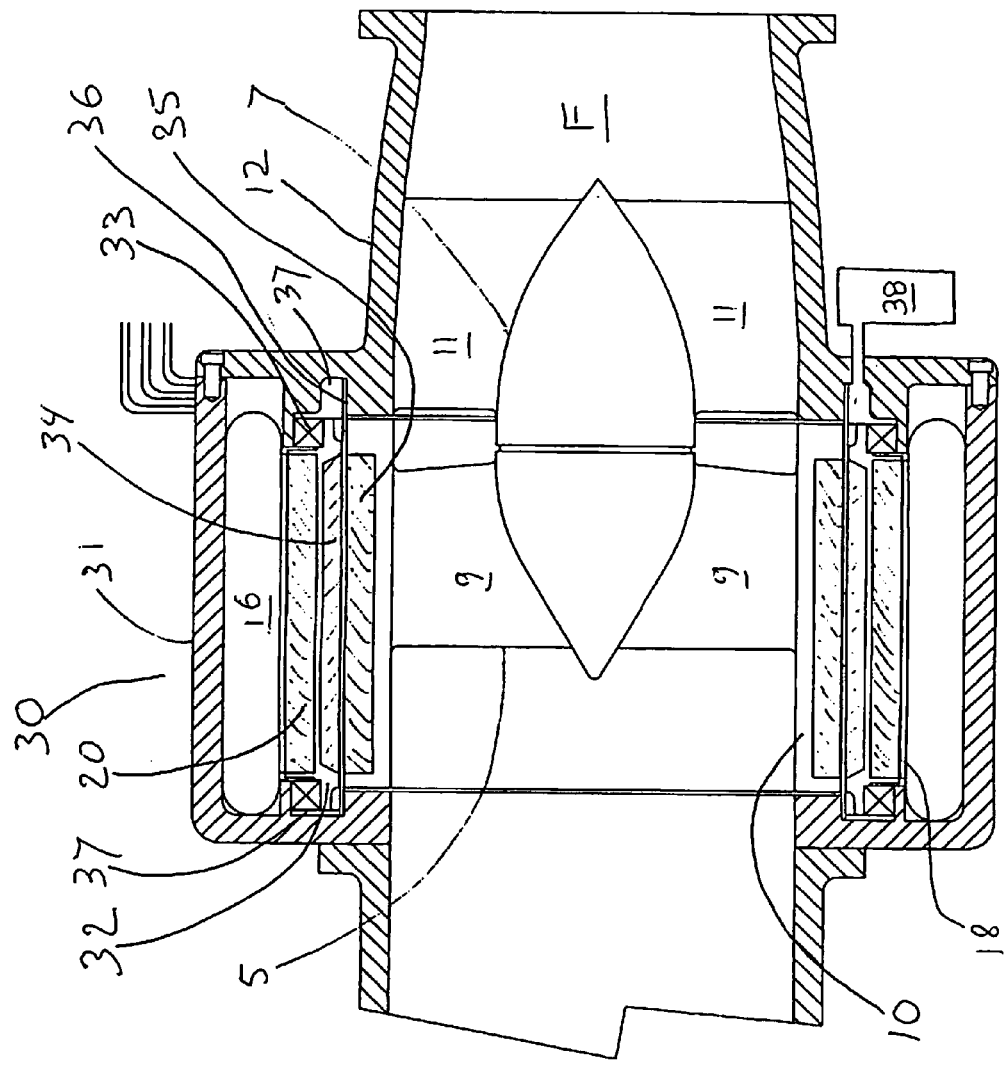
FIG. 4  ALTERNATIVE EMBODIMENT WITH MOTOR/GENERATOR ROTOR NOT EXPOSED TO FLUID

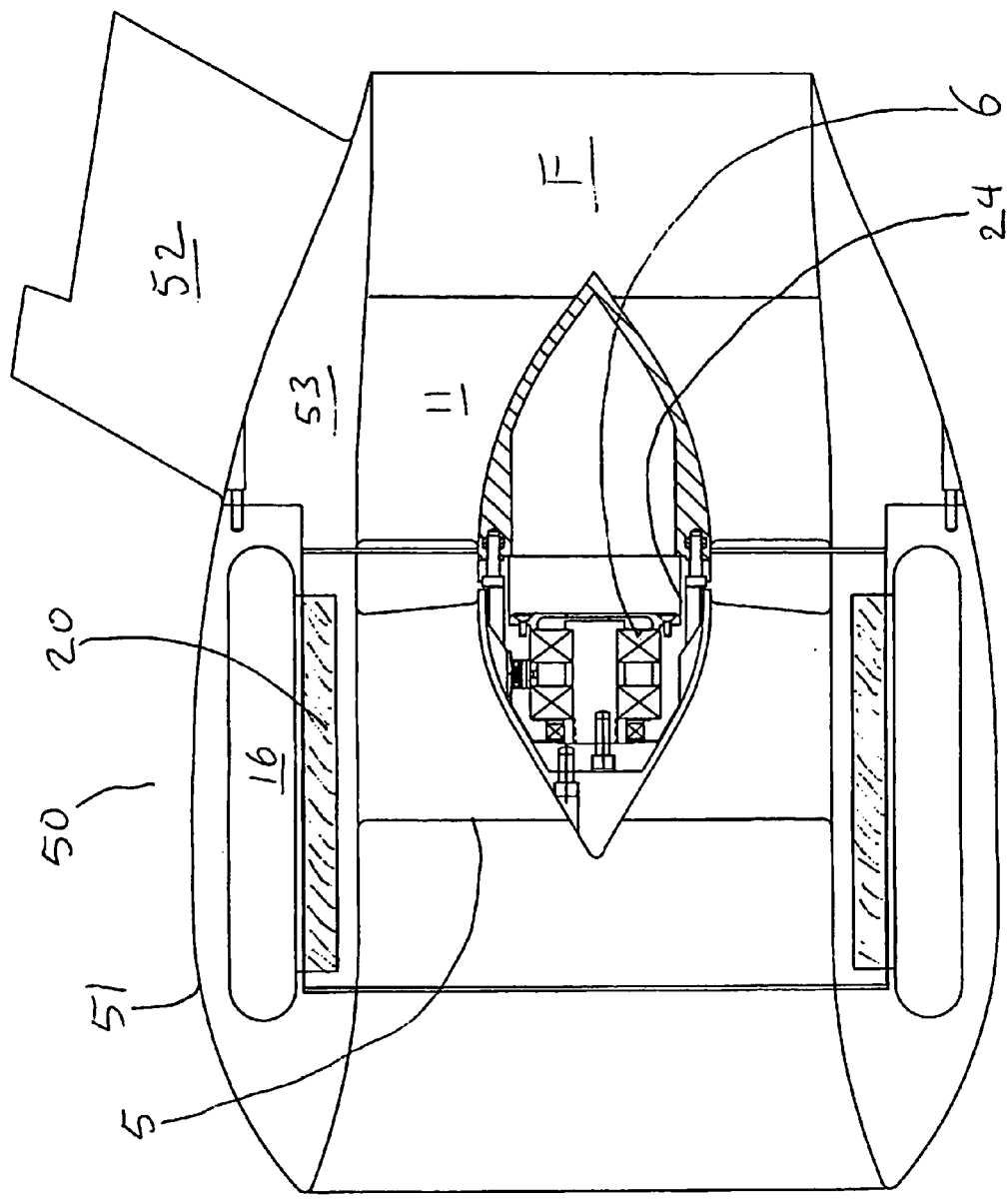
FIG. 5 UNDERWATER MARINE PROPULSOR

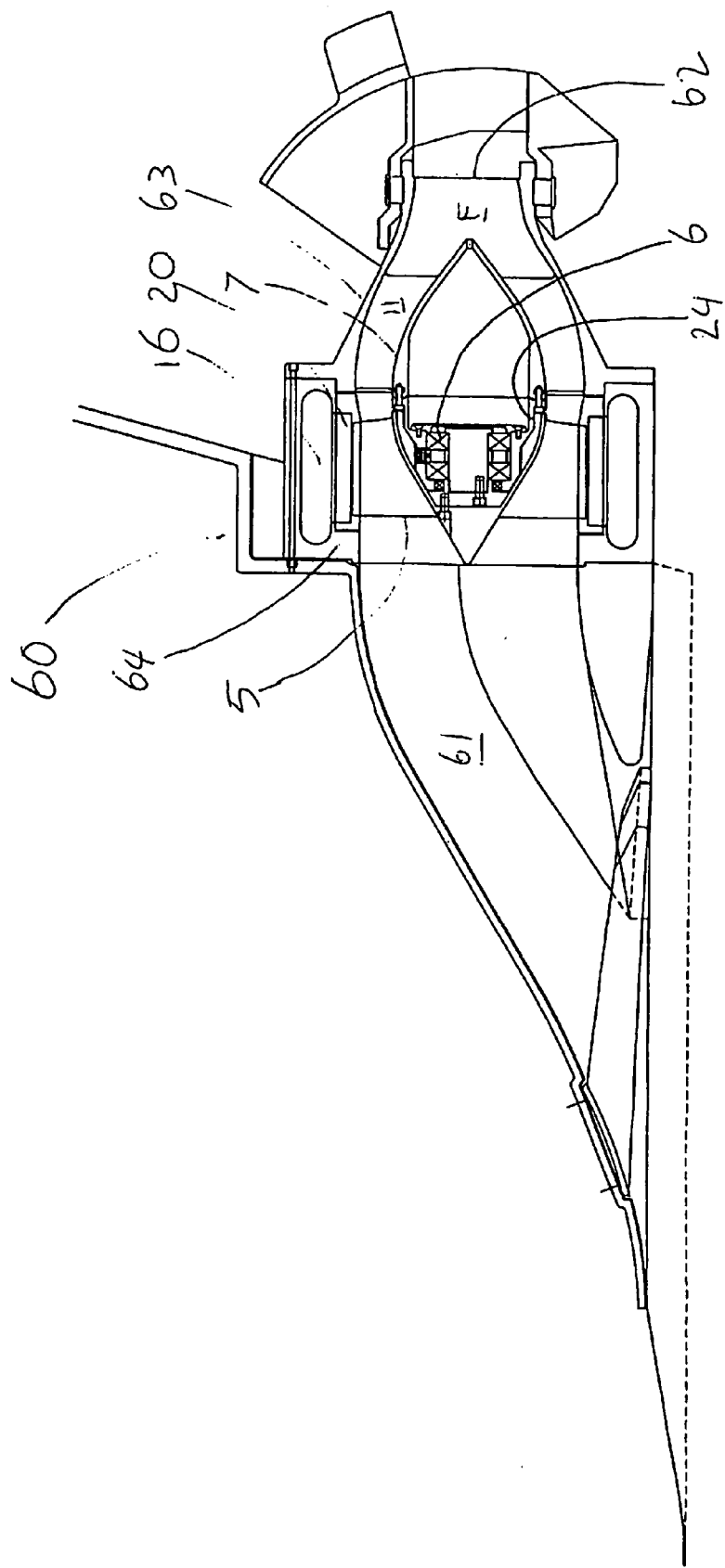
FIG. 6    MARINE WET ROTOR WATERJET PROPULSOR

INTEGRATED FLUID POWER CONVERSION SYSTEM

RELATED APPLICATION

This application claims the benefit of U.S. Provisional Application No. 60/606,447, filed Sep. 1, 2004 and U.S. Provisional Application No. 60/619,646, filed Oct. 18, 2004, the contents of which are incorporated herein.

FIELD OF THE INVENTION

This invention relates to the field of fluid power conversion and more particularly to electrical motor-driven fluid pumps and fluid-driven electrical power generation.

BACKGROUND OF THE INVENTION

Fluid power conversion apparatus such as a turbine-generator combination or an electrically-driven continuous flow pump, an example of which is shown in FIG. 1, typically has an external motor 105 driving the pump 106 which causes fluid flow through pump 106 in direction A. Since the process is reversible, the same configuration can be used to convert fluid flow to electrical power. In such a case, a turbine 106 is driven by the kinetic energy of fluid flow through turbine 106 in direction B and drives an electrical generator 105 that is placed outside the turbine housing.

In both of these cases, the drawback of separating the functions of the motor and the pump (or the turbine and the generator) is that it requires that a shaft 102 pass through a housing penetration 100. Housing penetration 100 requires a rotary seal 101 between shaft 102 and housing 103 to prevent escape of the fluid or the ingress of ambient air. In both cases, an external bearing 104 is needed to support shaft 102 connected to impeller 107.

Another drawback of such systems is that a bend in the inlet or outlet duct 103 is needed to allow shaft 102 to exit in line with impeller 107, disturbing the natural flow direction of the fluid and adversely affecting efficiency. Also, the presence of shaft 102 in the flow creates turbulence and drag, also adversely affecting efficiency.

A further drawback is that the bend in duct 103 complicates the installation, especially in locations with tight space requirements. Installation with in-line flange connections is not possible.

Lastly, the motor or generator is a separate entity from the pump or turbine, requiring that these components be installed so as to maintain the alignment of the shafts of each of the pair of components. This requires that a coupling 108 be placed in between the pair of shafts. The motor and pump or turbine and generator need to be mounted to a common base (not shown) to maintain such alignment during operation and to transmit the generated torque from one to the other.

To adapt the high rotational speed of an electric motor/generator to the lower speed of the pump/turbine, a gearbox is frequently placed between pump/turbine and motor/generator, adding another component which then requires yet another coupling. Alignment between motor/generator and pump/turbine are required, and the torque compensation provided by a common base is also necessary.

An electric motor or generator rejects heat during the consumption or generation of electric power and requires the removal of the heat through an external cooling system for the motor or generator.

All of these drawbacks are summarized in the following list:

the need for a drive shaft, fluid seal and external bearing;
separate components resulting in high acquisition costs;
flow turbulence caused by the duct bend and the drive shaft;
the duct bend complicating installation and preventing in-line installation;
the need to align and install separate components on a common base;
the need for a gearbox further complicating the installation; and
the need for an external cooling system, all resulting in higher costs, inefficient operation and inefficient use of space.

The present invention arranges the fluid power conversion apparatus by combining the impeller and the motor/generator rotor concentrically and in radially-coincidental planes whereby the armature windings are outside the fluid flow path at the pump periphery, and the armature is fixed to an outer housing. The motor/generator rotor is attached directly to the impeller at the periphery of the impeller blade tips.

The present invention eliminates all extraneous requirements of the conventional pump or turbine as described above, namely the drive shaft, the external bearing, the shaft seal, the bend in the duct, the installation and alignment of the motor/generator, a common installation base, a gearbox, and the external cooling requirements of the motor/generator. All of this is accomplished by integrating the motor/generator with the pump/turbine impeller in a more efficient and compact way.

The motor/generator rotor is affixed directly to the pump/turbine impeller and is "wet" (exposed to the fluid flow) while the armature with windings is located outside the fluid flow pump/turbine housing. The gap between armature and rotor is situated at a greater diameter from the centerline than is economically practical with a suitable conventional electric motor or generator so that more torque can be generated and more power can be transmitted at lower shaft speed then in an otherwise identical motor envelope. The fluid is forced through the rotor/armature gap to cool the motor/generator by the pressure difference between the intake and outlet side of the impeller. An impeller support bearing serves as a common bearing for both pump/turbine and motor/generator.

The wet rotor consists of magnets and encapsulating material and contains no electrical windings or brushes, thereby eliminating the need to keep the rotor dry. The larger diameter of the rotor of the electric motor/generator in combination with electronic speed control/power conditioning can perform the function of a conventional gearbox.

In a hollow rotor design that is entirely supported at the periphery, the bearing and the water seal are placed at the periphery of the rotor around the impeller. This requires an expensive, large diameter bearing and seal and is difficult to maintain over extended periods of operation. In the present invention, the impeller/rotor bearing is not placed at the periphery of the impeller but at the centerline of the pump/turbine, and the support is supplied by a hub held in place by the pump/turbine diffusor stator vanes.

OBJECTS OF THE INVENTION

It is an object of this invention to provide a significantly more compact fluid power conversion apparatus applicable to a variety of fluid power conversion applications.

Another object of this invention is to provide a fluid power conversion apparatus which can be placed inline within a fluid duct with minimal external components.

Another object of this invention is to provide a fluid power conversion apparatus with lower acquisition, installation and maintenance costs.

Another object of this invention is to provide a fluid power conversion apparatus with many fewer components than conventional systems and with no external enclosure.

Another object of this invention is to provide a fluid power conversion apparatus that weighs much less than conventional systems.

Another object of this invention is to provide a fluid power conversion apparatus with higher efficiency than conventional systems.

Other objects of this invention include eliminating the need for an external bearing, a bend in the duct, an external water seal, a drive shaft, shaft couplings, a gearbox, a common foundation, separate major system components, and an external cooling system.

A further object is to simplify the fluid power conversion apparatus in structural design so that components may be built of lower-cost, non-corroding lightweight composite components.

A still further object is to provide a fluid power conversion apparatus which can be used as an electric marine propulsion apparatus of a simpler, more efficient and lower-cost design.

These and other objects of the invention will be apparent from the following descriptions and from the drawings.

SUMMARY OF THE INVENTION

The present invention is a fluid power conversion apparatus which can serve the functions of fluid pumping and/or power-generation. The inventive apparatus comprises: an impeller having an impeller hub and a periphery; a housing around the impeller; a diffusor having (a) an outer wall attached to the housing, (b) a diffusor hub rotatably supporting the impeller, and (c) at least one stator vane securing the diffusor hub to the outer wall; and a rotating electrical machine having (a) an armature attached to the housing and (b) a rotor attached to the impeller periphery and positioned to form a gap between rotor and armature, whereby the impeller and the rotor form an integrated unit with fluid flow through the rotor.

In one preferred embodiment of the inventive apparatus, the rotating electrical machine is an electric motor and the apparatus is used as a fluid pump. In a highly preferred embodiment, a portion of the fluid flows through the gap to cool the motor.

In other embodiments of the apparatus, the diffusor hub rotatably supports the impeller with a thrust bearing.

In yet another embodiment, the rotor attachment to the impeller is made by a magnetic coupling having inner and outer coupling elements and a sealed barrier between the inner and outer coupling elements, thereby isolating the motor from fluid being pumped.

Another preferred embodiment of the inventive apparatus further includes an oil circulating and cooling apparatus, and the motor is filled with oil.

In an alternative embodiment of the invention, the apparatus includes an intake duct and a exit nozzle and the power conversion apparatus is used for marine propulsion. In some such embodiments, the exit nozzle is under the water surface and the apparatus is used as an underwater thruster, and in other such embodiments, the exit nozzle is above the water surface and the apparatus is used as a waterjet.

In an additional preferred embodiment of this inventive integrated fluid power conversion apparatus, the rotating electrical machine is a generator and the apparatus is used as a fluid-driven electrical power generator. In some such embodiments, a portion of the fluid flows through the gap to cool the motor.

In highly preferred embodiments, the rotor attachment to the impeller is made by a magnetic coupling having inner and outer coupling elements and a sealed barrier between the inner and outer coupling elements, whereby the generator is isolated from fluid being pumped. Some such embodiments further include an oil circulating and cooling apparatus and the generator is filled with oil.

The term "turbine" is used to identify an appliance designed to be driven by fluid flow, recovering kinetic energy from this flow and turning it into a rotary output.

The term "impeller" refers to a driving (pump) and driven (turbine) rotating hydrodynamically-shaped rotary foil that can impart or recover kinetic energy to or from a fluid.

The term "pump/turbine" identifies the substantially-identical hardware the function of which is reversible: when driven by a rotary mechanical input, it pumps a fluid; when a fluid is driven through it, it produces a rotary mechanical output to, for example, drive an electric generator.

The term "motor/generator" identifies the substantially-identical hardware the function of which is reversible: it performs as a motor when electrical current is supplied and generates electrical current when driven by a rotary mechanical input.

The term "pump/motor" identifies the integrated pump and electric motor that is one embodiment of the present invention. The term "turbine/generator" identifies the integrated turbine and electric generator that is also an embodiment of the present invention. In each case, the physical hardware of such fluid power conversion apparatus is substantially identical.

BRIEF DESCRIPTION OF THE DRAWINGS

FIG. 1 is an elevation partial section of a conventional power conversion system and is marked PRIOR ART.

FIG. 2 is a detailed elevation section of a preferred embodiment of the inventive integrated fluid power conversion apparatus.

FIG. 3 is a detailed elevation of the apparatus of FIG. 2 showing the armature and rotor separated and the rotor and impeller bearing supported by the diffusor.

FIG. 4 is a detailed elevation section of an alternative embodiment of the inventive. In this embodiment, the rotor is not exposed to the fluid and a magnetic coupling is used between the impeller and rotor.

FIG. 5 is a detailed elevation section of the apparatus of FIG. 2 used as an underwater marine propulsor.

FIG. 6 is a detailed elevation section of the apparatus of FIG. 2 used as an above-water marine propulsor.

DETAILED DESCRIPTION OF PREFERRED EMBODIMENTS

Since the invention is a fluid power conversion apparatus that is reversible in function (producing a turbine generating electric current or an electric motor driving a continuous flow pump), the detailed description of either function is intended to cover both functions. FIGS. 2 and 3 show a power conversion apparatus 1 installed in between intake and discharge pipes 2 and 3 and is connected with flange connections 4. An impeller 5 consists of impeller hub 8, impeller blades 9 and peripheral sleeve 10, which is supported by impeller blades 9. Impeller 5 is rotatably supported by a bearing pack 6 mounted in a bearing housing 24 which, in turn, is supported by a diffusor hub 7 of a diffusor 12. The diffusor hub 7 is held fixedly in place by stator vanes 11 inside diffusor 12. A housing 13 is bolted to diffusor 12 and is held in alignment by a register 14. An armature 16 with windings 17 is inserted in housing 13 and is encapsulated therein by a composite material 15. The peripheral sleeve 10 of impeller 5 holds a rotor 20 consisting of permanent magnets which make impeller 5 rotate when electrical current is applied to windings 17 via leads 21 and conversely produces electric current at leads 21 when impeller 5 is rotated. A gap 18 separates rotor 20 and armature 16 and is at the farthest possible distance from the rotational centerline of the pump/turbine providing a larger torque arm, thereby allowing greater power transmission at lower speed than is practical with a conventional motor/generator.

When operating in a pumping mode, the rotation of impeller 5 will force fluid F to flow in a direction 22, pressurizing the fluid down stream from impeller 5 in discharge pipe 3. The increased pressure will force a portion of fluid F to pass through gap 18 between rotor 20 and armature 16 and flow to the intake side of sleeve 10. This flow produces cooling for the armature 16 and rotor 20. Conversely, when operating in a power generating mode, fluid F flows in a direction 23 causing impeller 5 to rotate and creating a pressure differential across impeller 5, thereby forcing a portion of fluid F to pass through gap 18.

Rotor 20, armature 16 and gap 18 are shown in cylindrical shape; however, other embodiments may have tapered or curved shapes in place of the cylindrical shape shown.

In another embodiment in certain applications, rotor 20 and armature 16 must not be in the fluid environment of fluid F and can be isolated by means of a magnetic coupler including a magnetic outer coupling element 34 and a magnetic inner coupling element 35 as shown in FIG. 4. A housing 31 holds armature 16 and rotating assembly 32 that is rotatably-supported by bearings 33. Rotating assembly 32 holds rotor 20 as well as magnetic outer coupling element 34. A barrier 36 separates armature 16, rotating assembly 32 with rotor 20, coupling element 34 and bearings 33 from fluid F passing through fluid power conversion apparatus 30. Sleeve 10 of impeller 5 carries magnetic inner coupling element 35. A void space 37 and gap 18 may be filled with oil for lubrication of bearings 33, and the oil may be re-circulated and cooled by an oil cooling and pumping system 38 to dissipate the heat generated by fluid power conversion apparatus 30.

In another embodiment of the invention, the apparatus from integration of motor and pump is a marine underwater propulsor 50 as shown in FIG. 5. Armature 16 is contained in an intake duct 51, in turn attached to a discharge nozzle 53 that carries stator vanes 11 and diffusor hub 7. Diffusor hub 7 in turn supports bearing pack 6 which in turn supports impeller 5 and rotor 20. Bearing pack 6 is attached to the hub 7 with bearing housing 24. The entire thruster is attached to the vessel (not shown) with a strut 52. Providing electric power to armature 16 causes impeller 5 to turn driving fluid F from intake duct 51 to discharge nozzle 53, thereby causing a propulsion force in an opposite direction in strut 52.

The identical embodiment described in the preceding paragraph can be an underwater power generating device by placing it fixedly under water in a river, tidal, pool or ocean current. Impeller 5 is now driven by the water current, and rotor 20 generates electricity in the windings of armature 16.

In yet another embodiment of the invention of pump/motor integration is a waterjet propulsor 60 as shown in FIG. 6. Armature 16 is contained in a pump housing 64 that is attached to intake duct 61. The diffusor 63 is attached to pump housing 64 and is provided with stator vanes 11, supporting diffusor hub 7. Bearing pack 6 rotatably supports the impeller 5 that is provided with sleeve 10 and rotor 20 at its periphery. Bearing pack 6 is fixedly supported by bearing housing 24 that in turn is fixedly fastened to diffusor hub 7. A nozzle 62 accelerates the fluid F ejecting it to the atmosphere so producing thrust in the direction opposite to the fluid flow when electric current is supplied to windings 17 of armature 16.

While the principles of this invention have been described in connection with specific embodiments, it should be understood clearly that these descriptions are made only by way of example and are not intended to limit the scope of the invention.

The invention claimed is:

1. A fluid power conversion apparatus serving fluid pumping and/or power-generation functions, comprising:
   an impeller having an impeller hub and a periphery;
   a housing around the impeller;
   a diffusor having (a) an outer wall attached to the housing, (b) a diffusor hub rotatably supporting the impeller, and (c) at least one stator vane securing the diffusor hub to the outer wall; and
   a rotating electrical machine having (a) an armature attached to the housing and (b) a rotor attached to the impeller periphery by a magnetic coupling having inner and outer coupling elements and a sealed barrier therebetween to isolate the electrical machine from fluid being pumped, the rotor being positioned to form a gap between the rotor and the armature,
   whereby the impeller and the rotor form an integrated unit with fluid flow through the rotor.

2. The apparatus of claim 1 wherein the rotating electrical machine is an electric motor and the apparatus is used as a fluid pump.

3. The apparatus of claim 2 wherein a portion of the fluid flows through the gap to cool the motor.

4. The apparatus of claim 2 wherein the diffusor hub rotatably supports the impeller with a thrust bearing.

5. The apparatus of claim 2, further including an oil circulating and cooling apparatus and wherein the motor is filled with oil.

6. The apparatus of claim 2 further including an intake duct and a exit nozzle, whereby the apparatus is used for marine propulsion.

7. The apparatus of claim 6 wherein the exit nozzle is under the water surface and the apparatus is used as an underwater thruster.

8. The apparatus of claim 6 wherein the exit nozzle is above the water surface and the apparatus is used as a waterjet.

9. The apparatus of claim 1 wherein the rotating electrical machine is a generator and the apparatus is used as a fluid-driven electrical power generator.

10. The apparatus of claim 9 wherein a portion of the fluid flows through the gap to cool the generator.

11. The apparatus of claim 9 wherein the diffusor hub rotatably supports the impeller with a thrust bearing.

12. The apparatus of claim 9 further including an oil circulating and cooling apparatus and wherein the generator is filled with oil.

* * * * *